(12) United States Patent
Suzuki

(10) Patent No.: US 12,368,711 B2
(45) Date of Patent: Jul. 22, 2025

(54) SERVER APPARATUS, TERMINAL, AUTHENTICATION SYSTEM, AUTHENTICATION METHOD, AND STORAGE MEDIUM

(71) Applicant: NEC Corporation, Tokyo (JP)

(72) Inventor: Hiroshi Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 17/791,721

(22) PCT Filed: Jan. 30, 2020

(86) PCT No.: PCT/JP2020/003291
§ 371 (c)(1),
(2) Date: Jul. 8, 2022

(87) PCT Pub. No.: WO2021/152755
PCT Pub. Date: Aug. 5, 2021

(65) Prior Publication Data
US 2023/0036355 A1    Feb. 2, 2023

(51) Int. Cl.
*H04L 9/40*    (2022.01)

(52) U.S. Cl.
CPC ............... *H04L 63/0861* (2013.01)

(58) Field of Classification Search
CPC .................. H04L 63/0861; G06F 21/32
See application file for complete search history.

(56) References Cited

U.S. PATENT DOCUMENTS

| | | | |
|---|---|---|---|
| 8,600,120 B2* | 12/2013 | Gonion | G06F 3/0485 |
| | | | 382/209 |
| 9,619,633 B1* | 4/2017 | Mortensen | H04L 63/0861 |
| 10,650,379 B2* | 5/2020 | Agrawal | G10L 17/24 |
| 10,764,300 B2* | 9/2020 | Maheshwari | G06F 21/45 |
| 2008/0031496 A1* | 2/2008 | Takagi | G06F 9/505 |
| | | | 709/201 |
| 2010/0223663 A1* | 9/2010 | Morimoto | G07C 9/257 |
| | | | 726/5 |
| 2015/0092996 A1 | 4/2015 | Tian | |

(Continued)

FOREIGN PATENT DOCUMENTS

| | | |
|---|---|---|
| JP | 2003-006162 A | 1/2003 |
| JP | 2005-122480 A | 5/2005 |

(Continued)

OTHER PUBLICATIONS

Japanese Office Communication for JP Application No. 2021-574353 issued on Jul. 5, 2022 with English Translation.

(Continued)

*Primary Examiner* — John M MacIlwinen

(57) ABSTRACT

A server apparatus includes a communication unit and a matching unit. The communication unit receives a matching request including an ID (Identifier) of an authentication algorithm supported by a terminal. The matching unit processes the matching request by using a registered user database in which IDs of users, feature values generated from biological information about the users, and IDs of authentication algorithms that can use the generated feature values are stored in association with each other.

13 Claims, 15 Drawing Sheets

(56) References Cited

U.S. PATENT DOCUMENTS

| | | | | |
|---|---|---|---|---|
| 2015/0294139 A1* | 10/2015 | Thompson | .............. | G06F 21/32 |
| | | | | 382/112 |
| 2017/0093851 A1* | 3/2017 | Allen | .................... | H04L 9/3263 |
| 2018/0145833 A1* | 5/2018 | Lin | ........................ | G06F 21/32 |
| 2018/0365049 A1* | 12/2018 | Rafiee | .................... | G06Q 20/08 |
| 2019/0109847 A1 | 4/2019 | Funane | | |
| 2020/0007536 A1* | 1/2020 | Piel | ..................... | G06Q 20/401 |

FOREIGN PATENT DOCUMENTS

| | | | |
|---|---|---|---|
| JP | 2009-129252 A | 6/2009 |
| JP | 2011-227843 A | 11/2011 |
| JP | 2015-069574 A | 4/2015 |
| JP | 2016-149086 A | 8/2016 |
| JP | 2016-157294 A | 9/2016 |
| JP | 2018-005272 A | 1/2018 |
| JP | 2019-070980 A | 5/2019 |

OTHER PUBLICATIONS

JP Office Action for Japanese Patent Application No. 2023-046276, mailed on Apr. 2, 2024 with English Translation.
International Search Report for PCT Application No. PCT/JP2020/003291, mailed on Apr. 7, 2020.
Written opinion for PCT Application No. PCT/JP2020/003291, mailed on Apr. 7, 2020.
JP Office Action for JP Application No. 2021-574353, mailed on May 11, 2022 with English Translation.
Extended European Search Report for EP Application No. 20916273.4, dated on Dec. 23, 2022.

\* cited by examiner

SERVER APPARATUS, TERMINAL, AUTHENTICATION SYSTEM, AUTHENTICATION METHOD, AND STORAGE MEDIUM

This application is a National Stage Entry of PCT/JP2020/003291 filed on Jan. 30, 2020, the contents of all of which are incorporated herein by reference, in their entirety.

TECHNICAL FIELD

The present invention relates to a server apparatus, a terminal, an authentication system, an authentication method, and a storage medium.

BACKGROUND ART

Services using biometric authentication are gaining popularity. For example, use of biometric authentication (for example, face authentication) for accommodation services at hotels and payment at retail stores are gaining popularity.

For example, PTL 1 describes providing a sales management system in which users can make payment more smoothly, more simply, and more certainly. In this system disclosed in PTL 1, when a user arrives at a store, a store terminal detects a proximity ID (Identifier) and transmits this proximity ID to a sales management server. When the user purchases a product or a service, the store terminal acquires biometric authentication data of the user. This biometric authentication data is transmitted to the sales management server. The sales management server includes a user registration information database in which user IDs, proximity IDs, biometric authentication data, and payment means information are previously registered in association with each other. Upon receiving the biometric authentication data, the sales management server determines whether there is matching biometric authentication data by using the user IDs stored in a visiting user information database. If there is matching biometric authentication data, the sales management server completes its payment processing relating to the purchase of the product or the service by the user.

CITATION LIST

Patent Literature

[PTL 1] Japanese Unexamined Patent Application Publication No. JP2016-157294

SUMMARY OF INVENTION

Technical Problem

As disclosed in PTL 1, when biometric authentication is applied to shopping, etc., biological information is transmitted from a terminal (authentication terminal) installed at a store or the like to a server. The server determines the user by comparing previously registered biological information with the biological information acquired from the terminal.

Normally, a hotel operator and a retail store operator are different. For example, in most cases, providers of accommodation services at hotels are different from providers of payment services at retail stores. In such cases, if the above server performing biometric authentication can be installed for each service provider, even if the authentication algorithm, etc. used for biometric authentication are different, no significant problems are caused.

However, it is a heavy burden for a small-scale service provider to install and manage a biometric authentication server by themselves. One possible solution to this problem is installing a biometric authentication server per area or local government and allowing the biometric authentication server per area to provide biometric authentication services to the corresponding service providers such as hotels and retail stores. By installing these biometric authentication servers, service providers with a small operation scale can easily provide services using biometric authentication.

It is ideal that each of the service providers (hotels, retail stores, etc.) using a shared biometric authentication server as described above uses the same biometric authentication method (authentication algorithm; authentication engine). This is because the same kind of biological information can be registered in the above server if biometric authentication for accommodation services at hotels and for payment at retail stores can be provided by using the same authentication algorithm.

However, in reality, there are cases where different service providers adopt different authentication algorithms, for example, because of the cost for changing their existing terminals to those supporting biometric authentication. In other cases, for example, depending on the time of the installation of a terminal at a hotel or the like, the biometric authentication method (algorithm) or version of the terminal could differ. If an individual service provider or terminal uses a different authentication algorithm, it is necessary to prepare a server supporting each authentication algorithm, whereby the system is bloated.

It is a principal object of the present invention to provide a server apparatus, a terminal, an authentication system, an authentication method, and a storage medium that contribute to supporting various authentication algorithms.

Solution to Problem

According to a first aspect of the present invention, there is provided a server apparatus, including: a communication unit that receives a matching request including an ID (Identifier) of an authentication algorithm supported by a terminal; and a matching unit that processes the matching request by using a registered user database in which IDs of users, feature values generated from biological information about the users, and IDs of authentication algorithms that can use the generated feature values are stored in association with each other.

According to a second aspect of the present invention, there is provided a terminal, including: an acquisition unit that acquires biological information about a user; a transmission unit that transmits an ID (Identifier) of a user, a feature value generated from biological information about the user, and an ID of an authentication algorithm that can use the generated feature value to a server apparatus.

According to a third aspect of the present invention, there is provided an authentication system including: a terminal; and a server apparatus, wherein the server apparatus receives a matching request including an ID (Identifier) of an authentication algorithm supported by the terminal and processes the matching request by using a registered user database in which IDs of users, feature values generated from biological information about the users, and IDs of authentication algorithms that can use the generated feature values are stored in association with each other.

According to a fourth aspect of the present invention, there is provided an authentication method, used in an authentication system including a terminal and a server apparatus, the authentication method including: receiving a matching request including an ID (Identifier) of an authentication algorithm supported by the terminal; and processing the matching request by using a registered user database in which IDs of users, feature values generated from biological information about the users, and IDs of authentication algorithms that can use the generated feature values are stored in association with each other.

According to a fifth aspect of the present invention, there is provided a computer-readable storage medium, storing a program that causes a computer mounted on a server apparatus to perform processing for: receiving a matching request including an ID (Identifier) of an authentication algorithm supported by a terminal; and processing the matching request by using a registered user database in which IDs of users, feature values generated from biological information about the users, and IDs of authentication algorithms that can use the generated feature values are stored in association with each other.

Advantageous Effects of Invention

According to the individual aspects of the present invention, there are provided a server apparatus, a terminal, an authentication system, an authentication method, and a storage medium that contribute to supporting various authentication algorithms. The advantageous effects of the present invention are not limited to the above advantageous effect.

The present invention may provide other advantageous effects, instead of or in addition to the above advantageous effect.

EXAMPLE EMBODIMENT

Figure 1:
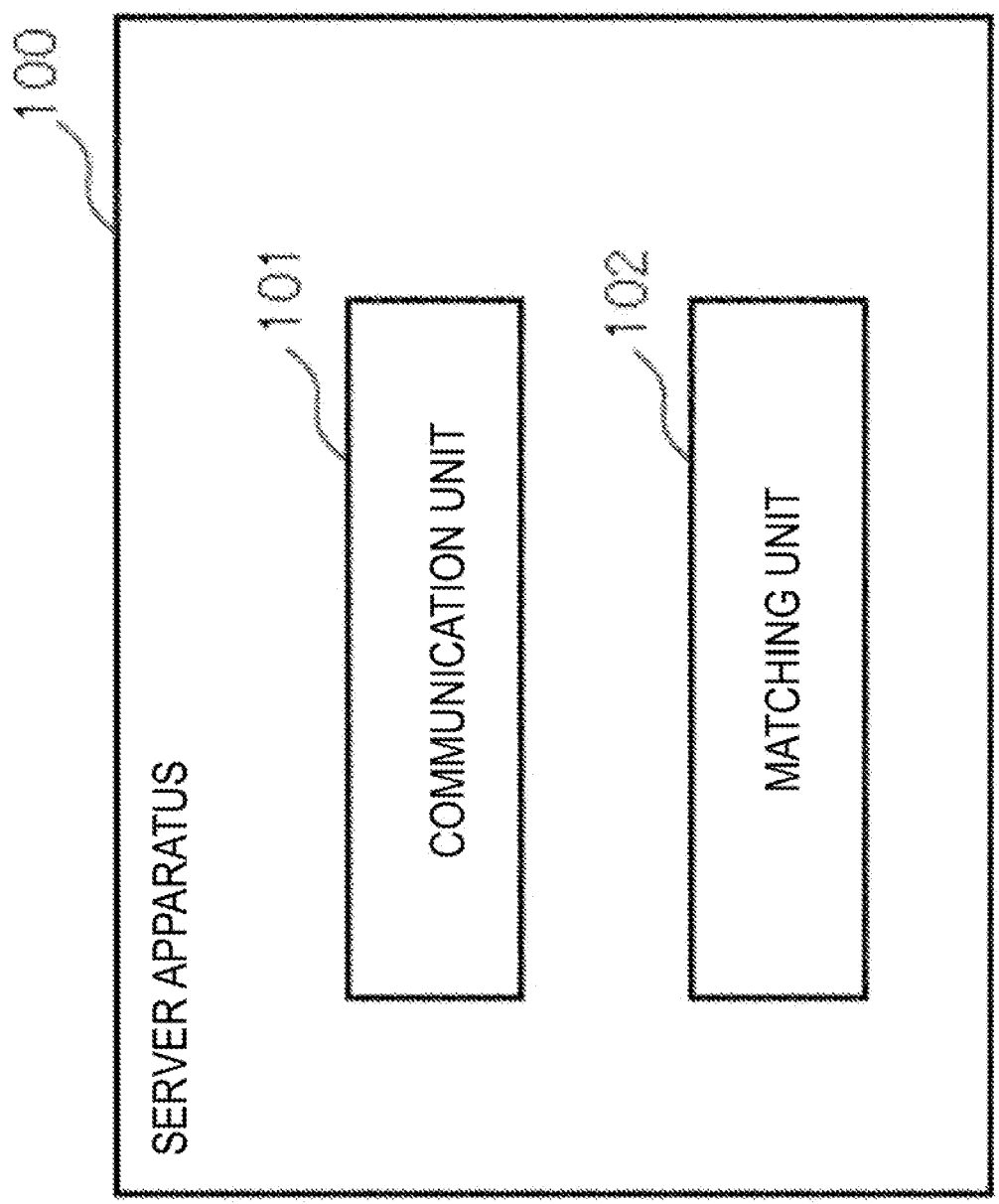
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A server apparatus 100 according to an example embodiment includes a communication unit 101 and a matching unit 102 (see FIG. 1). The communication unit 101 receives a matching request including an ID (Identifier) of an authentication algorithm supported by a terminal. The matching unit 102 processes the matching request by using a registered user database in which IDs of users, feature values generated from biological information about the users, and IDs of authentication algorithms that can use the generated feature values are stored in association with each other.

In the registered user database accessed by the server apparatus 100, at least IDs that determine system users, feature values of the system users, and IDs of authentication algorithms that can be used by terminals are stored in association with each other. By using the above database, the IDs of the authentication algorithms and the feature values suitable for these authentication algorithms (feature values that the authentication algorithms can use for matching processing) can be associated with each other. As a result, even when individual terminals requesting the server apparatus 100 to perform biometric authentication (matching) use different authentication algorithms, the server apparatus 100 can extract, from the database, feature values matching the feature values transmitted from the individual terminals at the time of matching. That is, by accessing the above database, the server apparatus 100 can support various authentication algorithms.

Hereinafter, specific example embodiments will be described in more detail with reference to drawings.

First Example Embodiment

A first example embodiment will be described in more detail with reference to drawings.

[System Configuration]

Figure 2:
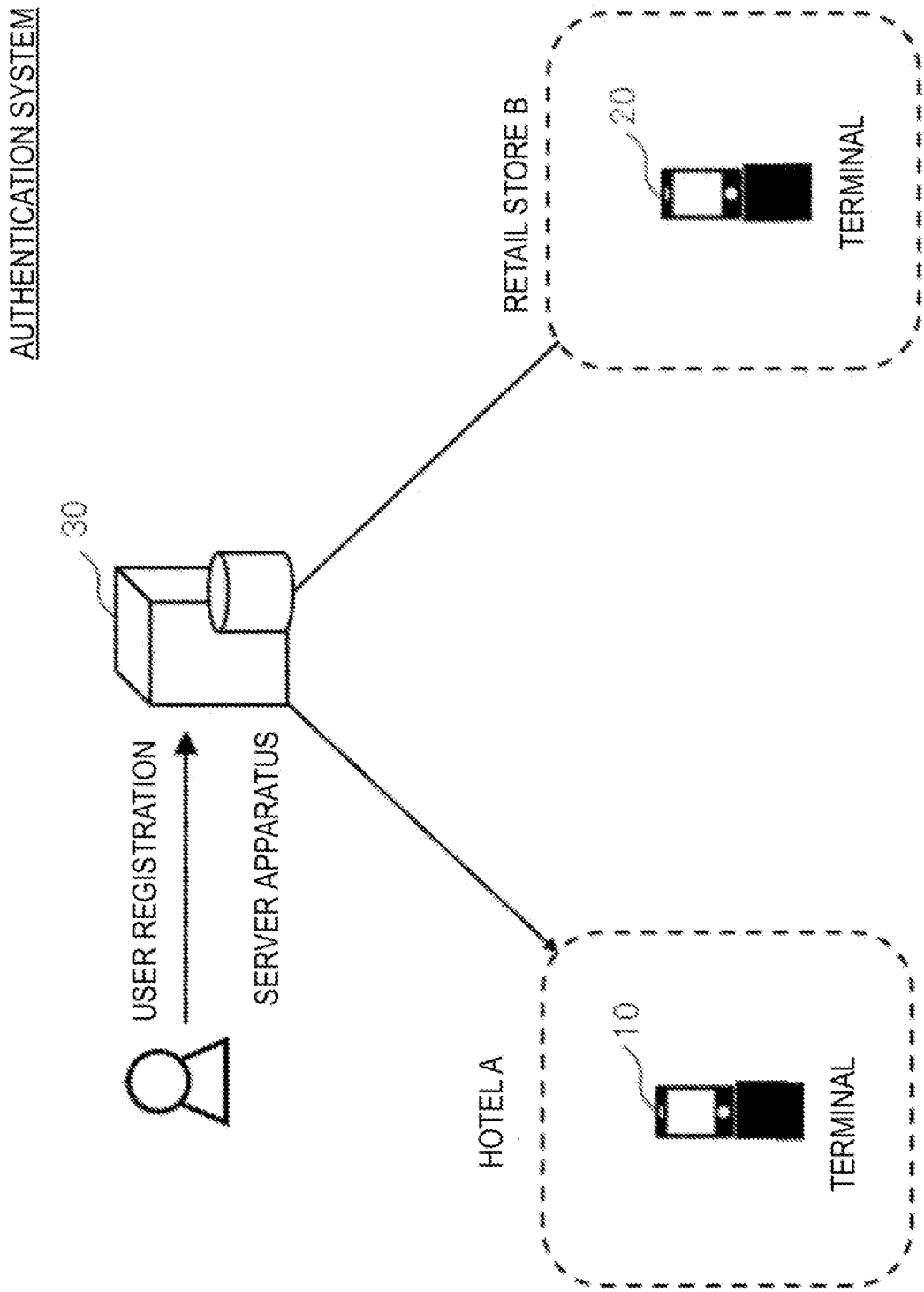
FIG. 2 is a diagram illustrating an example of a schematic configuration of an authentication system according to a first example embodiment.

FIG. 2 is a diagram illustrating an example of a schematic configuration of an authentication system according to a first example embodiment. As illustrated in FIG. 2, the authentication system includes a terminal 10, a terminal 20, and a server apparatus 30. The terminals 10 and 20 and the server apparatus 30 can communicate with each other via wired or wireless communication means. The configuration illustrated in FIG. 2 is an example, and for example, the number of terminals is not of course limited to this example illustrated in FIG. 2.

In the authentication system illustrated in FIG. 2, it is assumed that service providers belonging to various business types or fields provide services by using biometric authentication. The first example embodiment will be described based on a case in which the authentication system provides authentication services by using "faces (face images)" of users as biological information. However, the biological information used in the authentication system is not limited to "faces". For example, other biological information, such as an iris, may be used.

FIG. 2 illustrates an example in which a hotel A and a retail store B provide services (accommodation services, shopping) through face authentication. The hotel and the retail store are examples. For example, local governments, etc. may function as the above service providers.

For example, the terminal 10 is installed at the hotel A and provides its guests with accommodation services through face authentication. For example, the terminal 10 performs check-in processing and locks and unlocks a reserved room for a user of the authentication system (which will hereinafter be referred to as a system user as needed) through face authentication. Specifically, the terminal 10 determines a user who visits the hotel through face authentication and performs check-in processing and unlocks a reserved room, for example.

For example, the terminal 20 is installed at the retail store B and allows customers to do shopping through face authentication. Specifically, the terminal 20 determines a customer through face authentication. The terminal 20 transmits payment information about the determined individual (for example, information about a credit card) to the payment processing server or the like and performs its payment processing on a product.

The server apparatus 30 is an apparatus that provides service providers (hotels, retail stores, etc.) participating in this authentication system with face authentication services. Specifically, the server apparatus 30 acquires feature values (feature values calculated from a face image) from a service provider (the terminal 10 or the terminal 20). The server apparatus 30 performs matching between the acquired feature values and the feature values registered in a database (1-to-N matching; N is a positive integer, and the same applies to the following description). The server apparatus 30 transmits the ID of the user determined in this matching to the corresponding service provider.

[Outline of System Operation]

Next, an outline of an operation in the authentication system according to the first example embodiment will be described with reference to drawings. The authentication system according to the first example embodiment includes three phases.

The first phase is "user registration phase" in which a user registers information necessary for using the authentication system in the server apparatus 30. A user who wishes to use the face authentication performs user registration in the user registration phase.

The second phase is "service-to-be-used registration phase" in which a user registers detailed information necessary for receiving provision of a service from a service provider in the service provider. In this service-to-be-used registration phase, a system user (a user who has completed the user registration in the authentication system) selects an individual service provider from which the user wishes to receive a service through face authentication and enters information to the individual service provider. In the example in FIG. 2, when a user wishes to receive an accommodation service at the hotel A through face authentication, the user enters detailed information (a name, an accommodation schedule, etc.) to the hotel A. When the user also wishes to receive provision of a service using face authentication from the retail store B, the user enters detailed information to the retail store B. If the user does not wish to receive provision of the service using face authentication from the retail store B, the user does not need to enter the detailed information to the retail store B.

The third phase is "authentication phase" in which the terminal 10 or 20 installed by a service provider authenticates a user. The phase in which a user who has completed the user registration and the service registration visits a service provider and receives provision of a service through face authentication is the authentication phase.

Hereinafter, the above three phases will be described.

[User Registration Phase]

Figure 3:
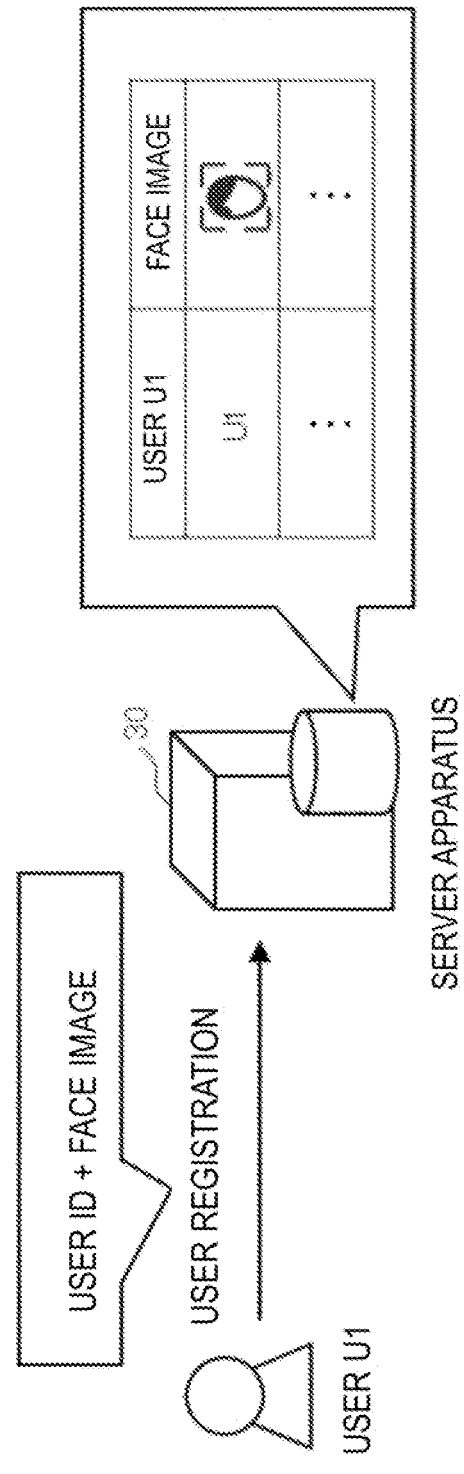
FIG. 3 is a diagram illustrating a user registration phase in the authentication system according to the first example embodiment.

As described above, a user who wishes to receive provision of a service using face authentication from individual service providers (the hotel A and the retail store B in the example in FIG. 2) performs pre-registration about use of the authentication system. Specifically, the user performs user registration on the server apparatus 30 via a WEB page, for example (see FIG. 3).

Specifically, the user accesses the WEB page and enters an ID (Identifier) that can uniquely determine this user to the server apparatus 30. In the following description, this ID will be referred to as a user ID. Any information can be used as the user ID, as long as the information can uniquely determine the user. For example, a combination of an ID and a password for accessing the WEB page may be used as the user ID. Alternatively, a tentative name such as a nickname may be used as the user ID. Still alternatively, the name of the user or information issued by a public agency such as the national government (for example, a 12-digit individual number) may be used as the user ID.

Alternatively, the server apparatus 30 may generate a user ID that uniquely determines the user from information entered by the user. For example, the server apparatus 30 may generate a user ID by combining a user name, a birth date, the date and time of the entry of the information, etc. and by calculating a hash value of the combined data. The server apparatus 30 notifies the corresponding user of the calculated user ID (for example, the above calculated hash value).

The user enters, in addition to the above user ID, his or her face image (biological information) to the server apparatus 30. For example, the user may acquire his or her face image by using a camera device mounted on a smartphone or the like and may enter the acquired face image to the server apparatus 30. Alternatively, the user may specify previously captured face image data (a face image file) and may upload this face image data to the server apparatus 30. The user enters the face image (biological information) to the server apparatus 30 by using any method.

The server apparatus 30 adds an entry regarding the information entered as described above (user information; a user ID, a face image) in the database. The user registration phase is completed when the server apparatus 30 adds this entry in the database. That is, when the user completes the above information registration, the registration for using the authentication system illustrated in FIG. 2 is completed.

[Service-to-be-Used Registration Phase]

Figure 4:
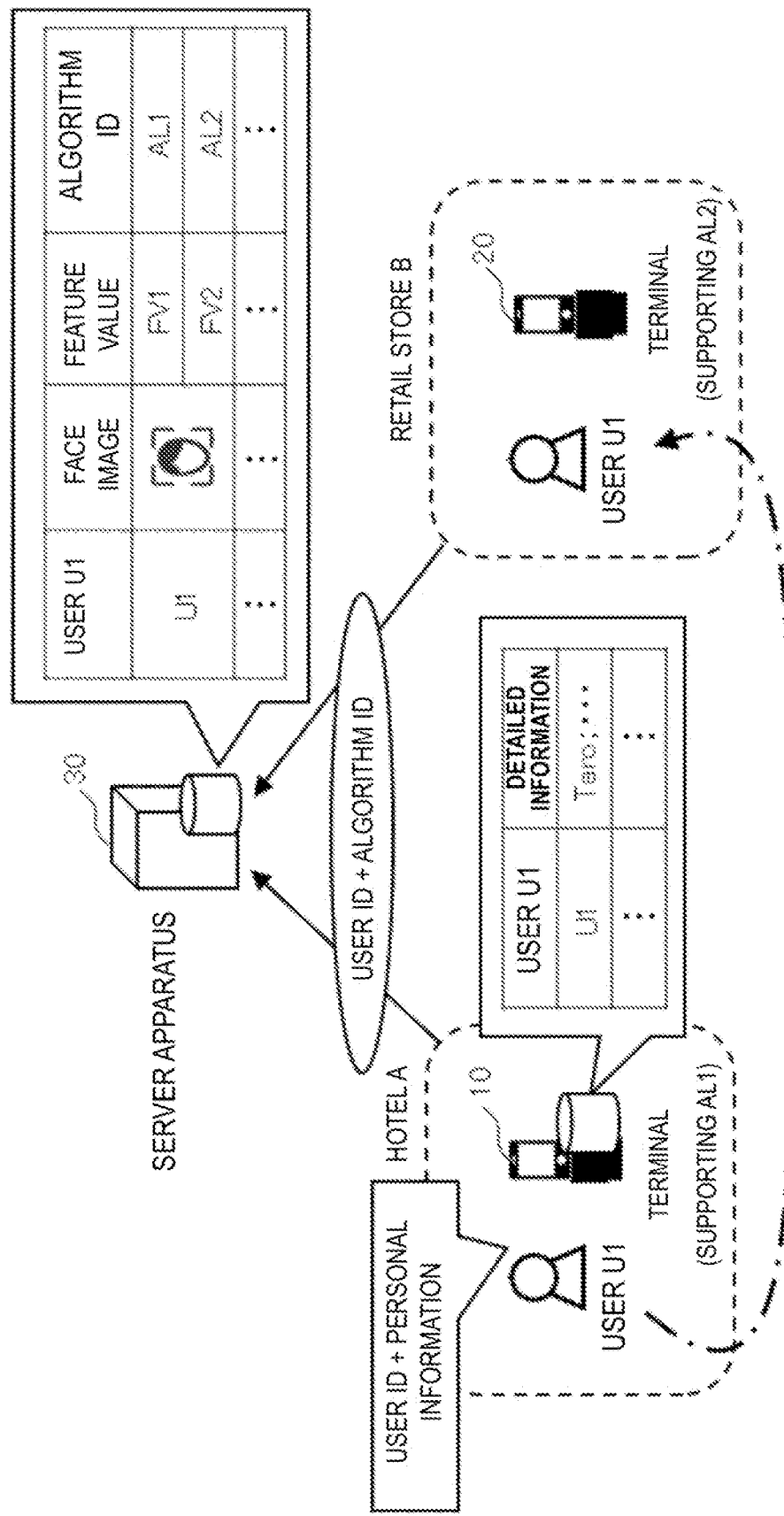
FIG. 4 is a diagram illustrating a service-to-be-used registration phase in the authentication system according to the first example embodiment.

When the information necessary for the system is registered, the user enters detailed information necessary for receiving a service from an individual service provider. For example, the user enters this information through a WEB page operated by a service provider or from a terminal installed at a facility of a service provider (see FIG. 4). FIG. 4 illustrates a case in which a user enters the above detailed information by using the terminals 10 and 20.

For example, a user who wishes to receive provision of an accommodation service at the hotel A enters details regarding accommodation (information about a schedule and a room for which the user wishes to make a reservation, for example), in addition of his or her personal information such as his or her name, address, and telephone number. Alternatively, a user who wishes to do shopping at the retail store B through face authentication enters, for example, information about a credit card, in addition to his or her name, etc.

In addition to the above detailed information (the name, the address, etc.), the user enters the user ID, which the user has entered to the server apparatus 30 in the user registration phase, to the terminals 10 and 20.

Upon acquiring the information such as the name and the user ID from the user, the service providers (the terminals 10 and 20) each manage these items of information in association with each other. The terminals 10 and 20 each add an entry regarding the user ID of the service user and the detailed information about the service user in a database.

The individual service provider transmits the acquired user ID and an algorithm ID indicating the method, the version, etc. of the face authentication algorithm supported by this service provider (the terminal 10 or 20) to the server apparatus 30. In the example in FIG. 4, the terminal 10 supports a face authentication algorithm denoted by "AL1" and transmits an algorithm ID that determines this algorithm to the server apparatus 30.

The server apparatus 30 determines an entry added in the user registration phase by using the user ID acquired from the terminal 10 or 20 and adds the acquired algorithm ID in the determined entry.

The server apparatus 30 generates, from the face image registered in the user registration phase, feature values (a feature vector from a plurality of feature values) suitable for the face authentication algorithm corresponding to the acquired algorithm ID. In other words, the server apparatus 30 generates feature values that can be used by the corresponding face authentication algorithm for matching processing. The server apparatus 30 adds the generated feature values to the entry corresponding to the user ID acquired from the terminal 10 or 20.

The user performs the above information registration (registration of a service to be used) for each service provider from which the user wishes to receive a service through face authentication. In the example in FIG. 4, after a user U1 registers detailed information at the hotel A, the user U1 registers detailed information at the retail store B.

[Authentication Phase]

Figure 5:
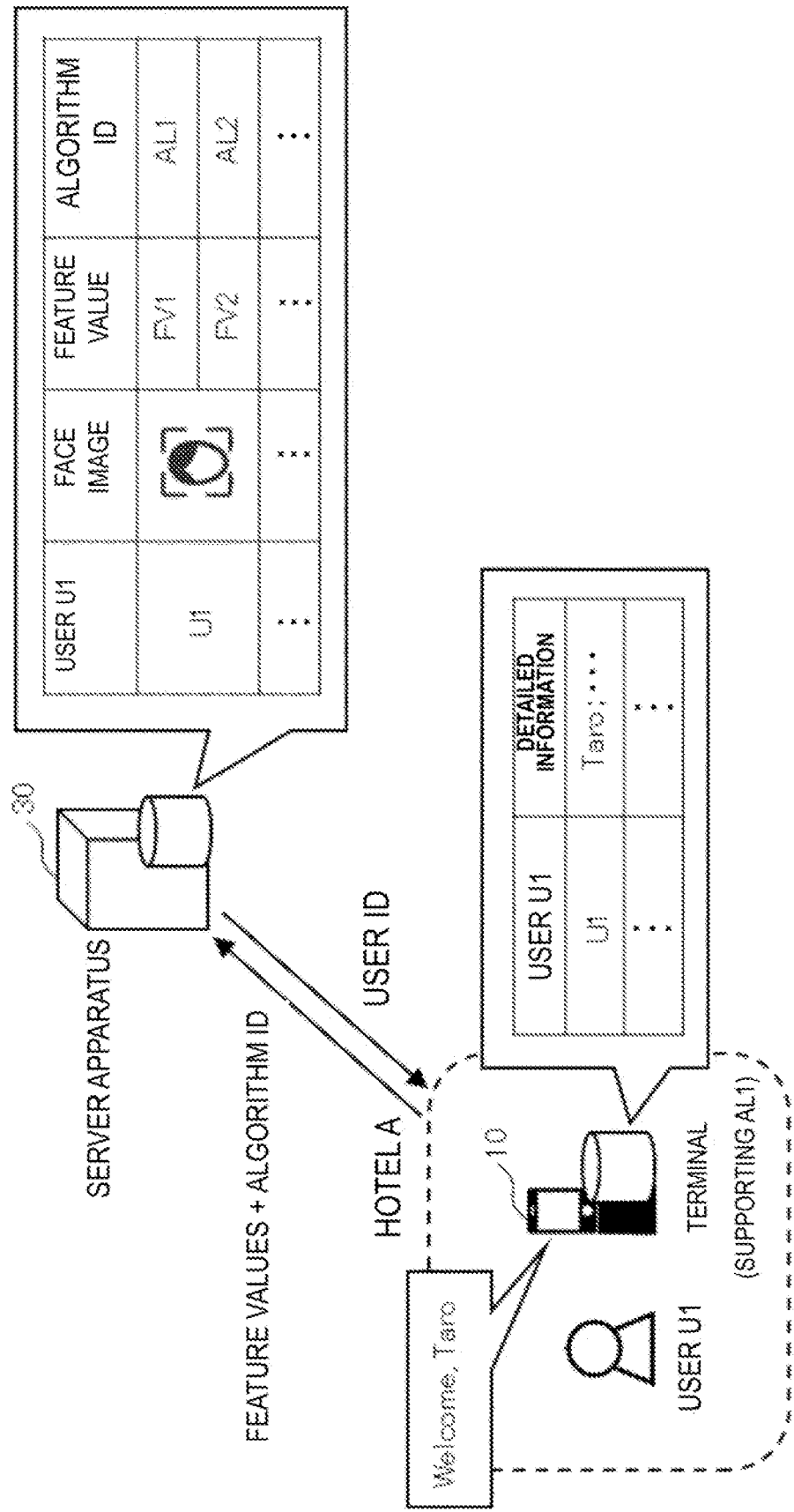
FIG. 5 is a diagram illustrating an authentication phase in the authentication system according to the first example embodiment.

After the service-to-be-used registration phase is completed, when detailed information necessary for the individual service providers is registered, the user visits the service providers (see FIG. 5). In the example in FIG. 5, the user U1 visits the hotel A and stands in front of the terminal 10.

When the distance between the user and the terminal 10 becomes shorter than a predetermined distance, the terminal 10 acquires a face image of the user standing in front of the terminal 10 and calculates feature values from the face image. In the example in FIG. 5, the terminal 10 calculates feature values suitable for the face authentication algorithm AL1.

The terminal 10 transmits a matching request including the calculated feature values and the algorithm ID of the face authentication algorithm supported by the terminal 10 to the server apparatus 30.

The server apparatus 30 performs matching processing on the entries (feature values) stored in the database, by using the acquired feature values and algorithm ID. Specifically, the server apparatus 30 extracts a plurality of feature values matching the acquired algorithm ID from the database. The server apparatus 30 performs 1-to-N matching between the feature values extracted by using the algorithm ID and the feature values acquired from the terminal 10. The server apparatus 30 determines feature values that substantially match the acquired feature values from the feature values (feature values registered in the database) suitable for the face authentication algorithm corresponding to the acquired algorithm ID.

The server apparatus 30 transmits the user ID corresponding to the feature values determined by the above matching to the terminal 10.

Upon acquiring the user ID, the terminal 10 determines the detailed information (information about the name, the address, etc.) corresponding to the user ID and provides the user with the corresponding service. In the example in FIG. 5, the name of the user U1 standing in front of the terminal 10 is determined as "Taro", and a message welcoming the user U1 is displayed on the terminal 10.

Next, details of the individual apparatuses included in the authentication system will be described.

[Server Apparatus]

Figure 6:
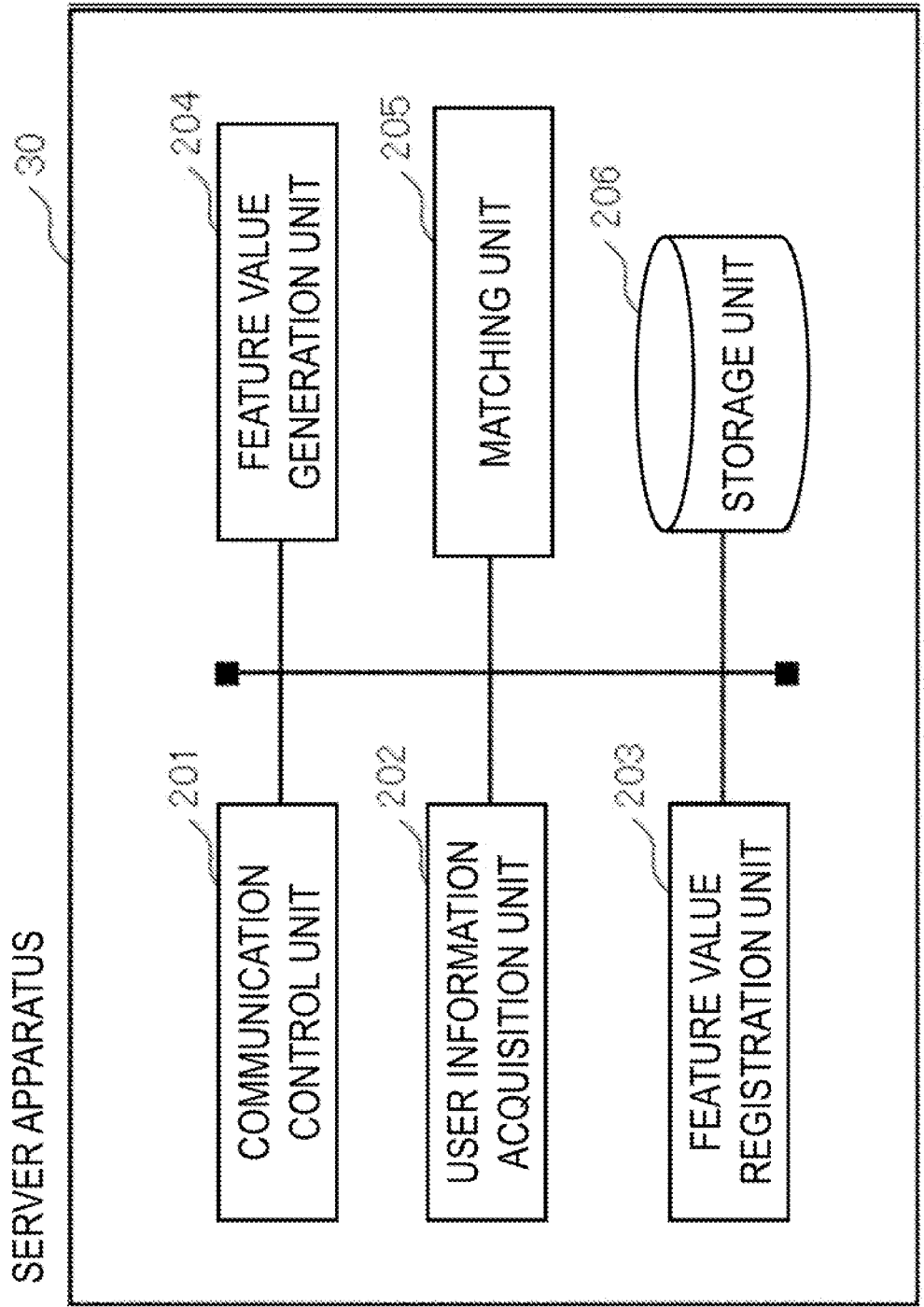
FIG. 6 is a diagram illustrating an example of a processing configuration of an authentication server according to the first example embodiment.

FIG. 6 is a diagram illustrating an example of a processing configuration (processing modules) of the server apparatus 30 according to the first example embodiment. As illustrated in FIG. 6, the server apparatus 30 includes a communication control unit 201, a user information acquisition unit 202, a feature value registration unit 203, a feature value generation unit 204, a matching unit 205, and a storage unit 206.

The communication control unit 201 is means for controlling communication with other apparatuses. Specifically, the communication control unit 201 receives data (packets) from the terminals 10 and 20. In addition, the communication control unit 201 transmits data to the terminals 10 and 20. For example, the communication control unit 201 receives matching requests including the IDs of the authentication algorithms supported by the terminals 10 and 20.

The user information acquisition unit 202 is means for acquiring user information about use of the system from users. Specifically, the user information acquisition unit 202 acquires a user ID and biological information (a face image) from a user. The user information acquisition unit 202 registers the acquired user ID and face image in a database (hereinafter referred to as a registered user database) in association with each other.

The feature value registration unit 203 is means for registering feature values of the users who have registered information for use of services in the registered user database. The feature value registration unit 203 acquires a user ID and an algorithm ID from a service provider. The feature value registration unit 203 determines an entry corresponding to the acquired user ID in the registered user database. The feature value registration unit 203 writes the acquired algorithm ID in an algorithm ID field of the determined entry.

If the combination of the user ID and the algorithm ID acquired from the service provider is already registered in the registered user database, the feature value registration unit 203 may discard the user ID and the algorithm ID acquired from the service provider.

The feature value registration unit 203 gives the face image (face image data) and the algorithm ID in the above determined entry to the feature value generation unit 204. The feature value registration unit 203 writes the feature values generated by the feature value generation unit 204 in a feature value field in the above determined entry.

The feature value registration unit 203 establishes a registered user database as illustrated in the upper part in FIG. 4. That is, a user ID, a face image, feature values, and an algorithm ID are managed in association with each other.

The feature value generation unit 204 is means for generating feature values from a face image. Specifically, the feature value generation unit 204 generates feature values suitable for a face authentication algorithm corresponding to an algorithm ID from a previously acquired face image. The feature value generation unit 204 generates feature values, which will be stored in the registered user database, from biological information about a user, the biological information having been acquired before matching processing.

Specifically, the feature value generation unit 204 extracts feature points from an acquired face image. For example, the feature value generation unit 204 extracts the eyes, the nose, the mouth, etc. from a face image, as the feature points. Next, the feature value generation unit 204 calculates the location of an individual feature point or the distance between feature points as a feature value and generates a feature vector obtained by a plurality of feature values (vector information that features the face image).

If face authentication algorithms are different, different locations are calculated as feature points, and different calculation methods are used for calculating feature values from feature points extracted. Thus, a face authentication algorithm and feature values that can be used by the face authentication algorithm have a correspondence relationship. Thus, unless feature values suitable for a corresponding face authentication algorithm are used, matching using this face authentication algorithm cannot be performed. For example, while a face authentication algorithm A can perform matching using feature values A suitable for the face authentication algorithm A, the face authentication algorithm A cannot perform matching using feature values B suitable for a face authentication algorithm B. Thus, a face authentication algorithm that performs matching processing using registered-side feature values and matching-side feature values cannot perform matching processing unless suitable feature values are used.

In view of the above circumstance, the feature value generation unit 204 generates feature values suitable for a face authentication algorithm corresponding to an algorithm ID acquired from the feature value registration unit 203. Specific processing regarding the feature point extraction processing and the feature value calculation processing can be performed by using existing techniques, detailed description of such processing will be omitted.

The feature value generation unit 204 gives the generated feature values to the feature value registration unit 203.

The matching unit 205 is means for performing matching processing between the feature values registered in the registered user database and the feature values acquired from the terminal 10 or 20. The matching unit 205 processes matching requests acquired from the terminals 10 and 20 by using the registered user database.

The matching unit 205 acquires matching requests from the service providers (the terminals 10 and 20). A matching request includes feature values of a user standing in front of the terminal 10 and an algorithm ID. The matching unit 205 acquires the feature values and the algorithm ID from the matching request. The matching unit 205 extracts entries storing an ID matching the acquired algorithm ID from the entries in the registered user database. The matching unit 205 sets the feature values in the extracted entries as the registered-side feature values and sets the feature values acquired from the matching request as the matching-side (matching target) feature values and performs 1-to-N matching.

The matching unit 205 calculates the similarity of the matching-side feature values with respect to the registered-side feature values. A chi square distance, a Euclidean distance, or the like may be used for the similarity. A longer distance represents a lower similarity, and a shorter distance represents a higher similarity.

Among the plurality of registered-side feature values, the matching unit 205 determines feature values whose similarity to the matching-side feature value is more than or equal to a predetermined value and is the highest.

The matching unit 205 transmits the user ID corresponding to the determined feature values to the terminal 10 or 20 as a reply to the matching request via the communication control unit 201.

The storage unit 206 stores various kinds of information necessary for the operation of the server apparatus 30. In addition, the registered user database is established in the storage unit 206. As described above, the registered user database stores IDs of users, feature values generated from biological information about the users, and IDs of authentication algorithms that can use the generated feature values in association with each other.

[Terminal]

Figure 7:
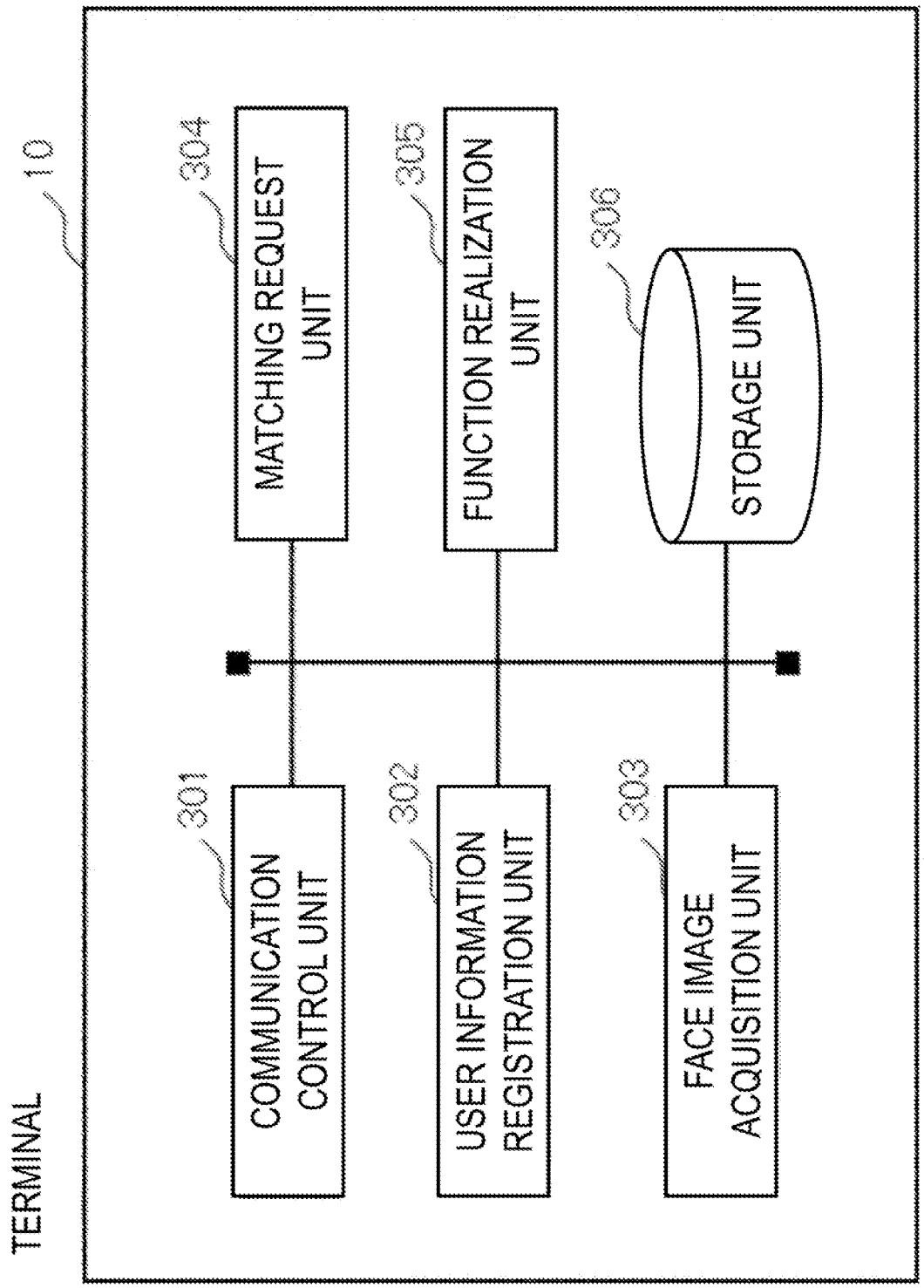
FIG. 7 is a diagram illustrating an example of a processing configuration of a terminal according to the first example embodiment.

FIG. 7 is a diagram illustrating an example of a processing configuration (processing modules) of the terminal 10 according to the first example embodiment. As illustrated in FIG. 7, the terminal 10 includes a communication control unit 301, a user information registration unit 302, a face image acquisition unit 303, a matching request unit 304, a function realization unit 305, and a storage unit 306. The terminal 10 and the terminal 20 may have the same processing configuration, and therefore, detailed description of the terminal 20 will be omitted.

The communication control unit 301 is means for controlling communication with other apparatuses. Specifically, the communication control unit 301 receives data (packets) from the server apparatus 30. In addition, the communication control unit 301 transmits data to the server apparatus 30.

The user information registration unit 302 is means for registering information (user IDs, detailed information) for providing services to system users in the service-to-be-used registration phase. Specifically, the user information registration unit 302 acquires a user ID and detailed information (for example, a name, an address, etc.) necessary for a service provider to provide a service to the user.

The user information registration unit 302 may use any method to acquire the above information. For example, the user information registration unit 302 may acquire the above information via a WEB page or the like operated or managed by the service provider. Alternatively, the user information registration unit 302 may acquire information entered by the user by using an input device (for example, a keyboard, a touch panel, a mouse, etc.) installed at the terminal 10. Alternatively, the user information registration unit 302 may acquire information by accessing an external database server storing user IDs and detailed information or may acquire information via a storage medium such as a USB (Universal Serial Bus) memory.

The user information registration unit 302 manages the acquired user ID and detailed information in association with each other. Specifically, the user information registration unit 302 adds an entry in a database (hereinafter referred to as a user database) established in the storage unit 306 and registers the user ID and detailed information in the entry.

The user information registration unit 302 transmits the acquired user ID and the algorithm ID of the face authentication algorithm supported by the corresponding terminal to the server apparatus 30. The algorithm ID is information on which both of the terminal 10 and the server apparatus 30 have agreed, and any information may be used as the algorithm ID as long as the information can uniquely determine an authentication algorithm. For example, a combination of the method and version of a face authentication algorithm may be used as the algorithm ID or a hash value calculated from the above combination may be used as the algorithm ID. If the hash value is used as the algorithm ID, the server apparatus 30 may determine the face authentication algorithm and the version thereof by referring to a table information in which the hash value and information that serves as the basis for the hash value (the method and version of the face authentication algorithm) are associated with each other.

The face image acquisition unit 303 is means for acquiring a face image (biological information) of a user in front of the corresponding terminal. For example, the face image acquisition unit 303 controls a camera apparatus. If the face image acquisition unit 303 detects a face area of a user in the images that the camera apparatus always or periodically captures, the camera apparatus captures the face of the user and acquires a face image.

If the size of the face area included in the captured image is more than or equal to a predetermined value, the face image acquisition unit 303 may extract the face area from the image. In this case, by appropriately adjusting the predetermined value (threshold), the face image acquisition unit 303 can acquire the face image of the user at a location a predetermined distance away from the terminal 10. That is, it is possible to prevent the user at a location far away from the terminal 10 from being captured and prevent feature values inappropriate for face authentication (1-to-N matching by the server apparatus 30) from being transmitted to the server apparatus 30.

Alternatively, the face image acquisition unit 303 may measure the distance between the terminal 10 and a user by using a distance sensor or the like and may acquire a face image of a user at a predetermined location. Alternatively, the face image acquisition unit 303 may acquire a plurality of images by using a camera, such as a stereo camera, which can measure the distance in the depth direction and may measure the distance between the corresponding terminal and the user by analyzing the plurality of images. In this case, if the distance between the corresponding terminal and the user is shorter than a predetermined threshold, the face image acquisition unit 303 acquires a face image.

The face image acquisition unit 303 gives the acquired face image to the matching request unit 304.

The matching request unit 304 is means for requesting the server apparatus 30 to perform matching to determine whether a person corresponding to the acquired face image is registered in the system. Specifically, the matching request unit 304 calculates feature values from the acquired face image. In this operation, the matching request unit 304 generates feature values suitable for the face authentication algorithm supported by the corresponding terminal.

The matching request unit 304 generates a matching request including the generated feature values and transmits the generated matching request to the server apparatus 30 via the communication control unit 301.

Figure 8:
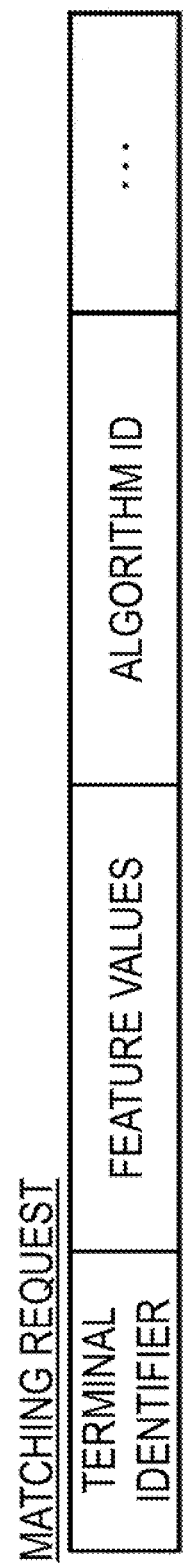
FIG. 8 is a diagram illustrating an example of a matching request transmitted by the terminal.

For example, the matching request unit 304 generates a matching request including an identifier of the corresponding apparatus (hereinafter referred to as a terminal identifier), the feature values, the algorithm ID, etc. (see FIG. 8). A MAC (Media Access Control) address or an IP (Internet Protocol) address of the terminal 10 may be used for the terminal identifier.

The matching request unit 304 receives a reply to the matching request from the server apparatus 30 via the communication control unit 301. The matching request unit 304 gives the reply (the user ID determined by 1-to-N matching) from the server apparatus 30 to the function realization unit 305.

The function realization unit 305 is means for realizing a function given to the terminal 10. Specifically, if the terminal 10 operates as a check-in terminal, the function realization unit 305 performs check-in-related processing. Since the operation of the function realization unit 305 varies depending on the function given to the terminal 10, more detailed description regarding the realization of this function will be omitted.

The storage unit 306 stores various kinds of information necessary for the operation of the terminal 10. In addition, a user database is established in the storage unit 306.

[System Operation]

Figure 9:
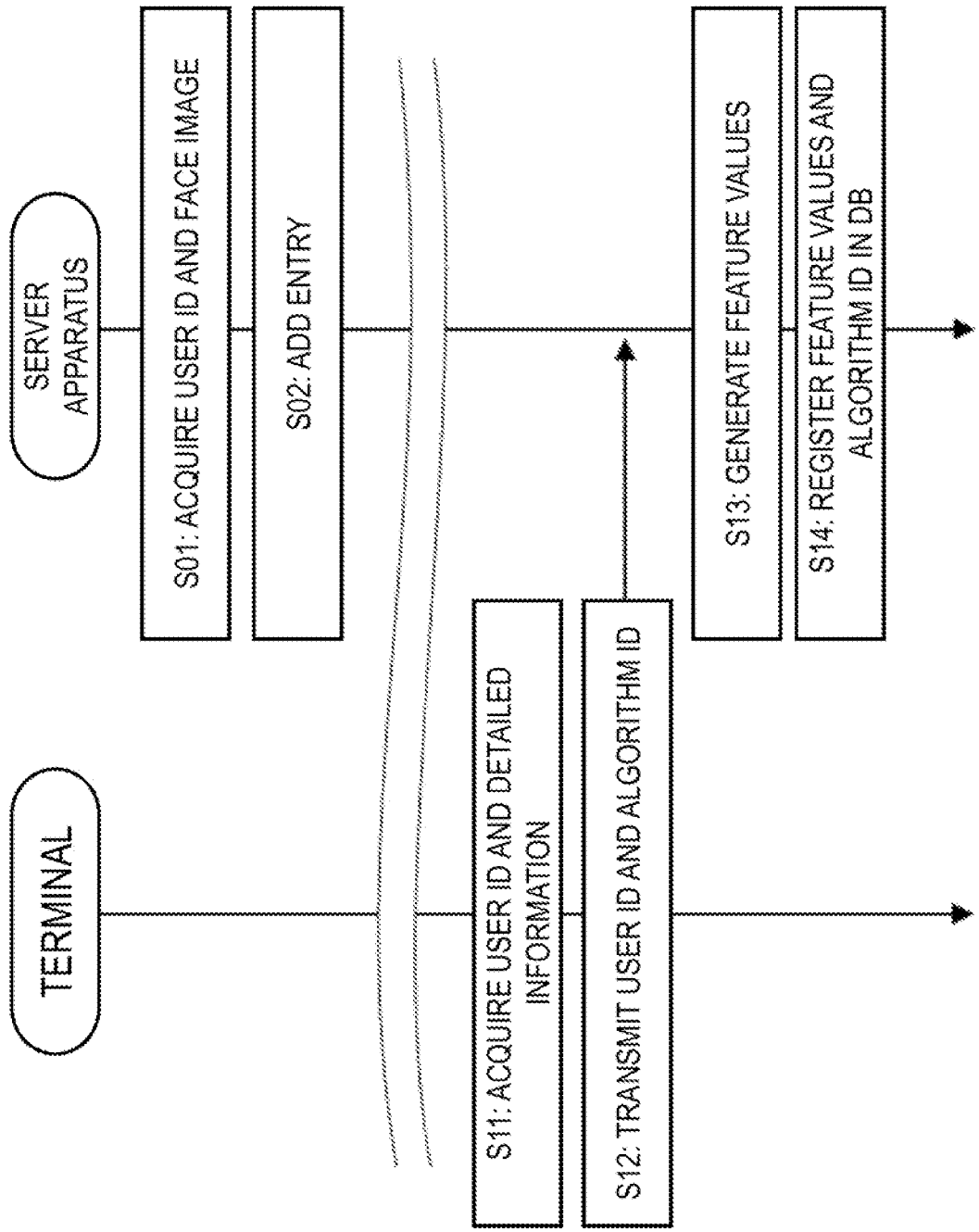
FIG. 9 is a sequence diagram illustrating an example of an operation in the user registration phase and an example of an operation in the service-to-be-used registration phase in the authentication system according to the first example embodiment.

Next, an operation in the authentication system according to the first example embodiment will be described. FIG. 9 is a sequence diagram illustrating an example of an operation in the user registration phase and an example of an operation in the service-to-be-used registration phase in the authentication system according to the first example embodiment.

In the user registration phase, the server apparatus 30 performs user registration on a user who wishes to use the authentication system. Specifically, the server apparatus 30 acquires a user ID and a face image from a user (step S01).

Next, the server apparatus 30 adds an entry in the registered user database (step S02).

In the service-to-be-used registration phase, the terminal 10 or 20 performs service-to-be-used registration for the system user. Specifically, the terminal 10 or 20 acquires the user ID and detailed information (information such as a name, etc.) necessary for provision of a service from the user (step S11).

The terminal 10 or 20 transmits the user ID and an algorithm ID to the server apparatus 30 (step S12).

The server apparatus 30 generates feature values suitable for the face authentication algorithm corresponding to the acquired algorithm ID (step S13). In this operation, the server apparatus 30 generates feature values from the face image entered by the user in the user registration phase.

The server apparatus 30 stores the generated feature values and the algorithm ID acquired from the terminal 10 or 20 in the registered user database (DB) (step S14).

Figure 10:
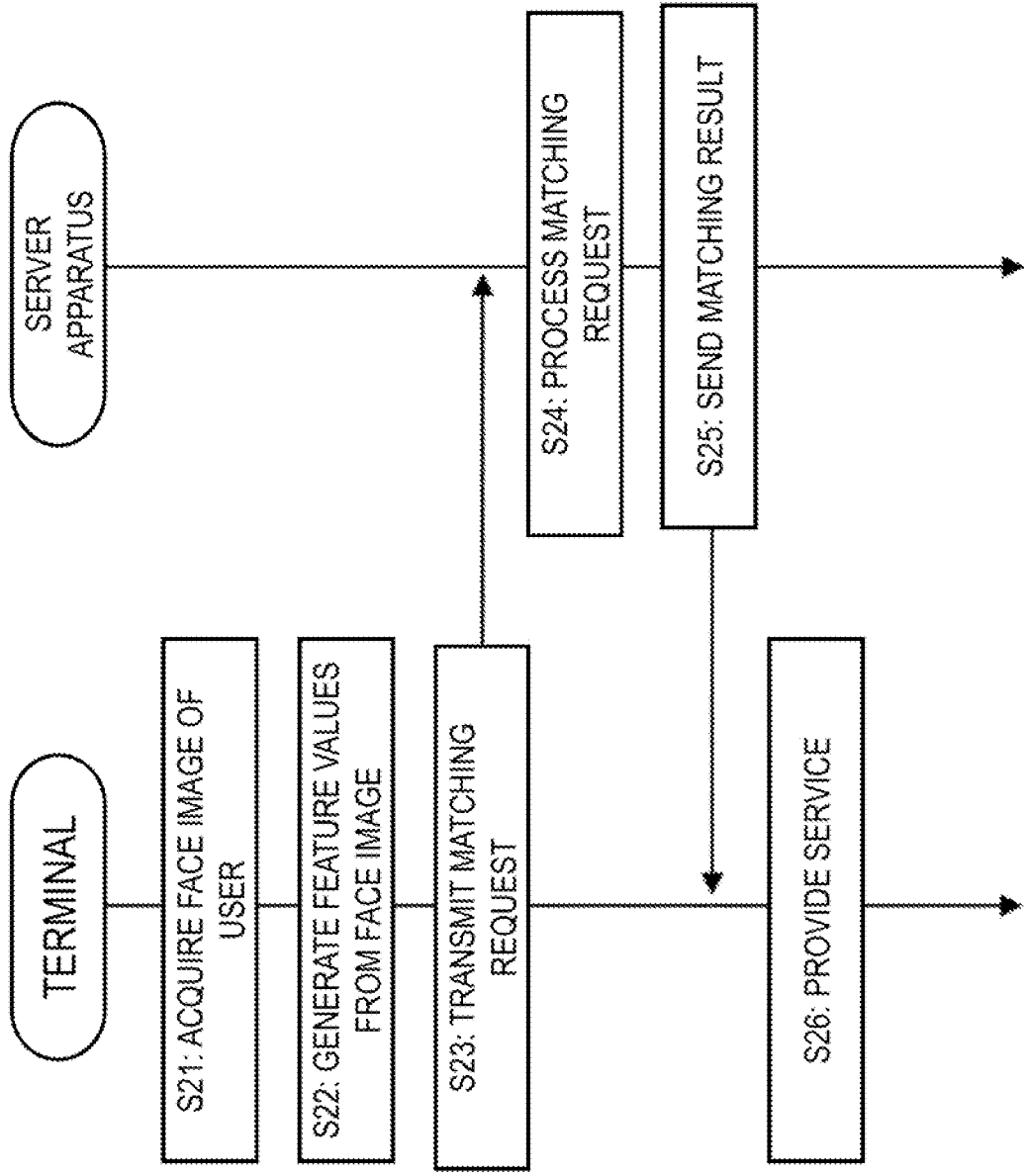
FIG. 10 is a sequence diagram illustrating an example of an operation in the authentication phase in the authentication system according to the first example embodiment.

FIG. 10 is a sequence diagram illustrating an example of an operation of the authentication phase in the authentication system according to the first example embodiment.

In the authentication phase, the system user visits the service provider (a service provision operator) on which the user has performed the service-to-be-used registration. The terminal 10 or 20 installed at the service provider acquires a face image of the user (step S21).

The terminal 10 or 20 generates feature values from the acquired face image (step S22). In this operation, the terminal 10 or 20 generates feature values suitable for the face authentication algorithm supported by the corresponding apparatus.

The terminal 10 or 20 transmits a matching request including the generated feature values and the algorithm ID to the server apparatus 30 (step S23).

The server apparatus 30 receives the matching request. Next, the server apparatus 30 processes the received matching request (step S24). Specifically, among the entries in the registered user database, the server apparatus 30 sets the feature values, which are included in the entries having an authentication algorithm ID matching the authentication algorithm ID included in the matching request, as the registered-side feature values. In addition, the server apparatus 30 sets the feature values included in the matching request as the matching-side feature values. The server apparatus 30 performs 1-to-N matching by using the above registered-side feature values and the above matching-side feature values.

The server apparatus 30 notifies the terminal 10 or 20 of a matching result (step S25). Specifically, if a user ID is determined by the matching processing, the server apparatus 30 transmits a matching result including this user ID to the matching request transmission source. Alternatively, as a result of the matching processing, if no feature values substantially matching the feature value included in the matching request are found, the server apparatus 30 notifies the transmission source to that effect.

The terminal 10 or 20 receives the matching result and provides a service to the user (step S26).

As described above, in the authentication system according to the first example embodiment, the server apparatus 30 performs matching processing by using a registered user database in which user IDs, feature values of system users, and IDs of authentication algorithms that can be used by terminals are stored in association with each other. Since this database stores feature values per authentication algorithm, the server apparatus 30 can perform matching processing by using an algorithm ID and feature values acquired from the terminal 10 or 20. As a result, even when the terminals 10 and 20 support different face authentication methods (face authentication algorithms), the server apparatus 30 can realize matching processing on a user by accessing a single database in which information about the user is aggregated. For example, even when the terminal 10 supports an authentication method of a vendor A and the terminal 20 supports an authentication method of a vendor B, the server apparatus 30 can provide the terminals 10 and 20 supporting the face authentication methods of the different vendors with face authentication services. That is, the server apparatus 30 operates as a centralized authentication station supporting face authentication algorithms of a plurality of vendors. Thus, service providers can adopt face authentication algorithms suitable for their own situations and environments and can provide face authentication services at low cost. This is because a service provider only needs to prepare the terminal 10 or 20 in which a face authentication algorithm is installed and does not need to prepare a high-cost face authentication server by themselves.

In addition, since face images of users are registered in the registered user database, even if a face authentication algorithm supported by the terminal 10 or 20 is changed, switching of the face authentication algorithm can be realized without requesting users to register their face images again. Specifically, the terminal 10 or 20 notifies the server apparatus 30 of a new face authentication algorithm to be used after the switching. Upon receiving this notification, the server apparatus 30 may generate feature values suitable for the new face authentication algorithm from the face images registered in the registered user database and may update the corresponding entries by using the generated feature values. Regarding this updating of these entries, the entire registered user database does not need to be updated. It is only sufficient to update the entries corresponding to the new face authentication algorithm (the new face authentication algorithm to be used by the terminal 10 or the terminal 20 after the switching).

In addition, in the registered user database (see FIG. 4) in the authentication system according to the first example embodiment, authentication information (feature values, algorithm IDs) suitable for a plurality of authentication algorithms are stored per user ID. Since a single user ID can be derived from a plurality of items of authentication information and there is no redundant information, a waste of resources is prevented. That is, in the registered user database, a minimum amount of information necessary for handling a plurality of authentication algorithms is stored.

In addition, in the authentication system according to the first example embodiment, if different service providers use the same face authentication algorithm, feature values do not need to be registered per service provider. This is because, in the present application disclosed, feature values are registered per authentication algorithm, not per service provider. In this respect, too, a waste of resources for establishing the database is prevented.

Second Example Embodiment

Next, a second example embodiment will be described in detail with reference to drawings.

The first example embodiment has been described based on a case in which the server apparatus 30 generates feature values from a previously acquired face image in the service-to-be-used registration phase. The second example embodiment will be described based on a case in which the terminals 10 and 20 generate feature values in the service-to-be-used registration phase.

In the second example embodiment, too, the operation in the authentication system is divided into three phases. Since the operation in the authentication phase in the three phases is the same as that described in the first example embodiment, the description of the authentication phase according to the second example embodiment will be omitted. The following description will be made with a focus on the difference in the user registration phase and the service-to-be-used registration phase between the first and second example embodiments.

In the user registration phase, while the individual user registers a user ID in the system, the user does not register a face image in the system. That is, the user information acquisition unit 202 of the server apparatus 30 acquires a user ID from a user, adds an entry in the registered user database, and stores the acquired user ID in the entry.

Figure 11:
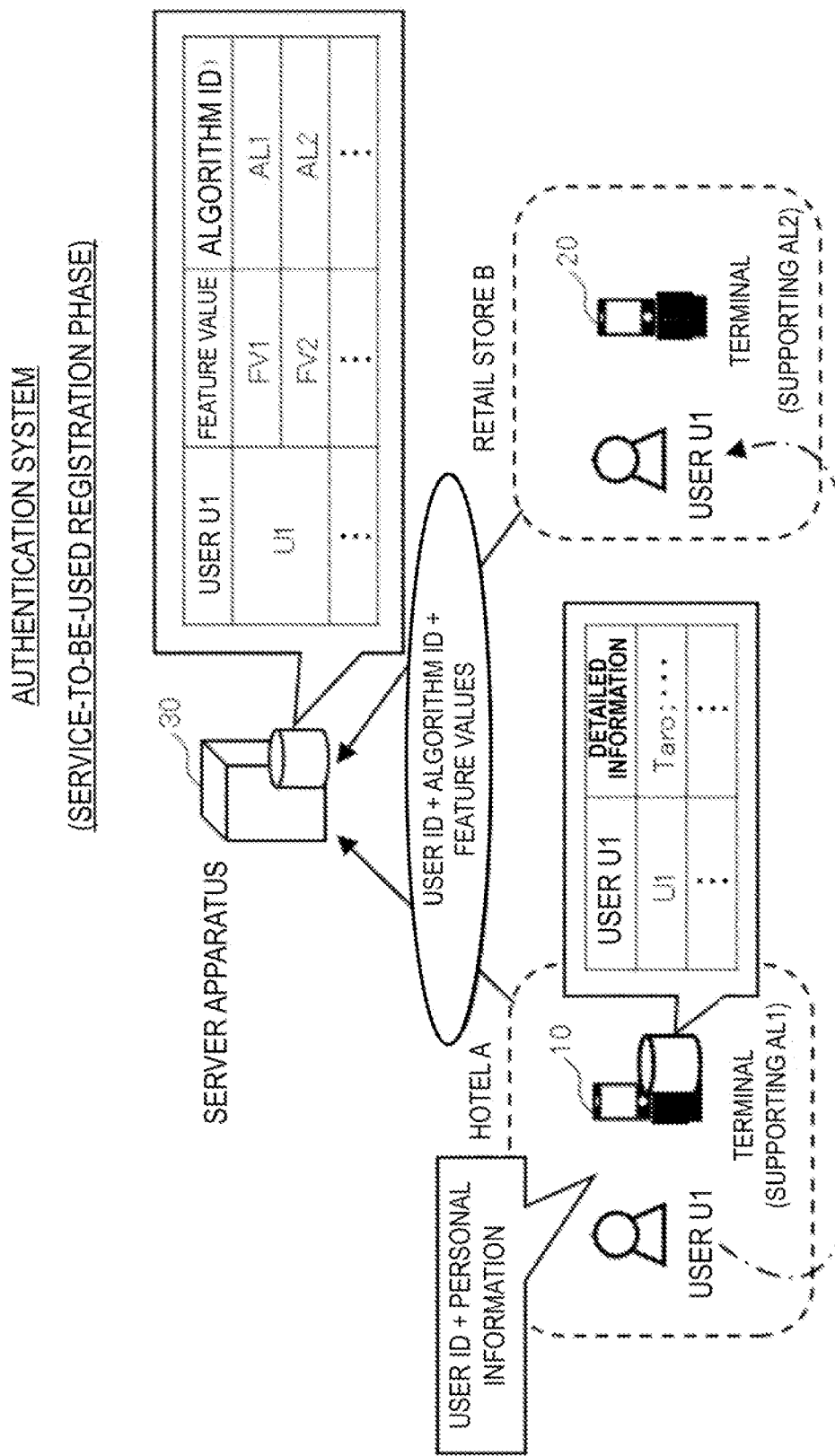
FIG. 11 is a diagram illustrating a service-to-be-used registration phase in an authentication system according to a second example embodiment.

In the service-to-be-used registration phase, when a user who wishes to perform service-to-be-used registration enters a user ID and detailed information (personal information such as a name and an address) to the terminal 10 or 20, a face image of the user is acquired. Next, the terminal 10 or 20 generates feature values from the acquired face image and transmits, along with the user ID and an algorithm ID, the generated feature values to the server apparatus 30 (see FIG. 11).

The server apparatus 30 in the service-to-be-used registration phase determines the corresponding entry in the registered user database by using the acquired user ID as a retrieval key and adds the feature values and the algorithm ID in the determined entry. According to the second example embodiment, the feature value registration unit 203 of the server apparatus 30 registers the feature values acquired from the terminal 10 or 20 (the feature values suitable for the face authentication algorithm supported by the corresponding terminal) in the registered user database. Through this registration operation, the registered user database described in the first example embodiment (database illustrated in the top right part in FIG. 4 and FIG. 11) is established.

Figure 12:
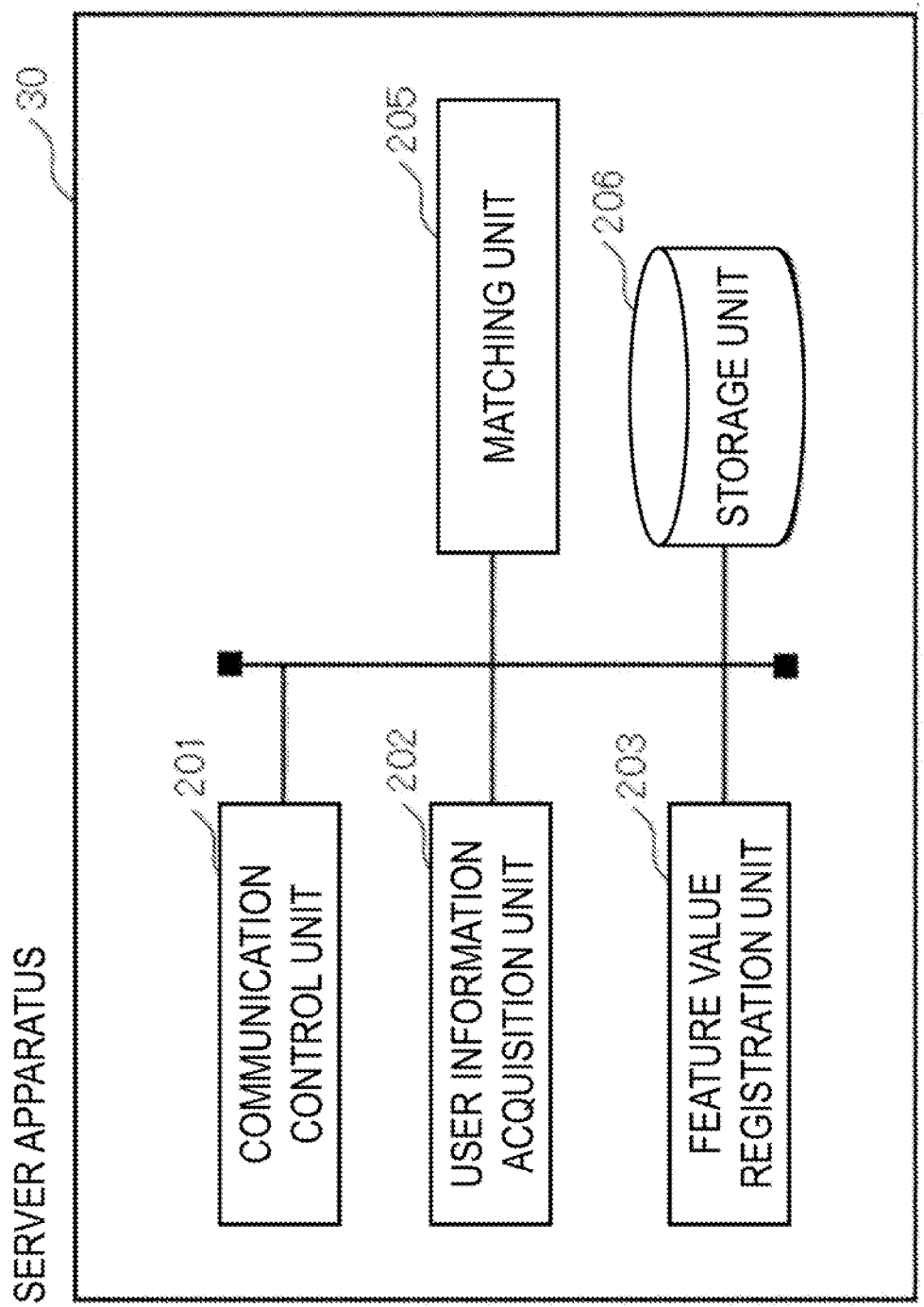
FIG. 12 is a diagram illustrating an example of a processing configuration of an authentication server according to the second example embodiment.
Figure 13:
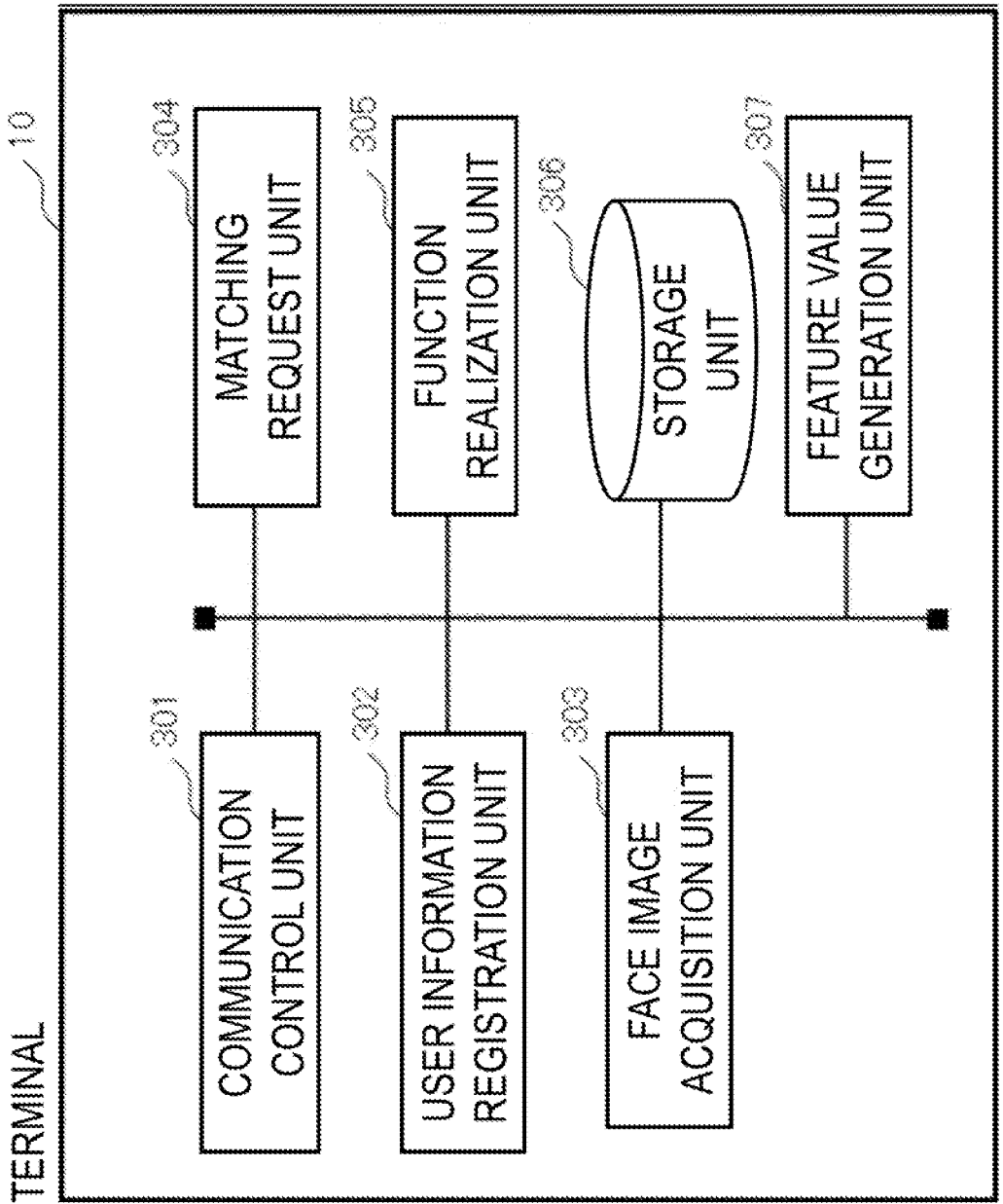
FIG. 13 is a diagram illustrating an example of a processing configuration of a terminal according to the second example embodiment.

The terminal 10 and the server apparatus 30 corresponding to the above description may have processing configurations illustrated in FIG. 12 and FIG. 13.

As illustrated in FIG. 12 and FIG. 13, while the server apparatus 30 does not include the "feature value generation unit", the terminal 10 includes a feature value generation unit 307. Other components (for example, the matching unit 205 and the matching request unit 304) included in the terminal 10 and the server apparatus 30 may be configured to operate in the same way as those described in the first example embodiment. Even if other components are configured to operate differently, since the difference is apparent to those skilled in the art, detailed description of these components will be omitted.

As described above, according to the second example embodiment, in the service-to-be-used registration phase, the terminals 10 and 20 generate feature values of users and transmit the generated feature values and algorithm IDs to the server apparatus 30. The server apparatus 30 establishes a registered user database by using the received feature values and algorithm IDs. In this way, according to the second example embodiment, the server apparatus 30 provides the authentication system supporting a plurality of authentication algorithms without storing face images of (biological information about) users. Since face images are not registered in the server apparatus 30, privacy of the users can be appropriately protected.

Figure 14:
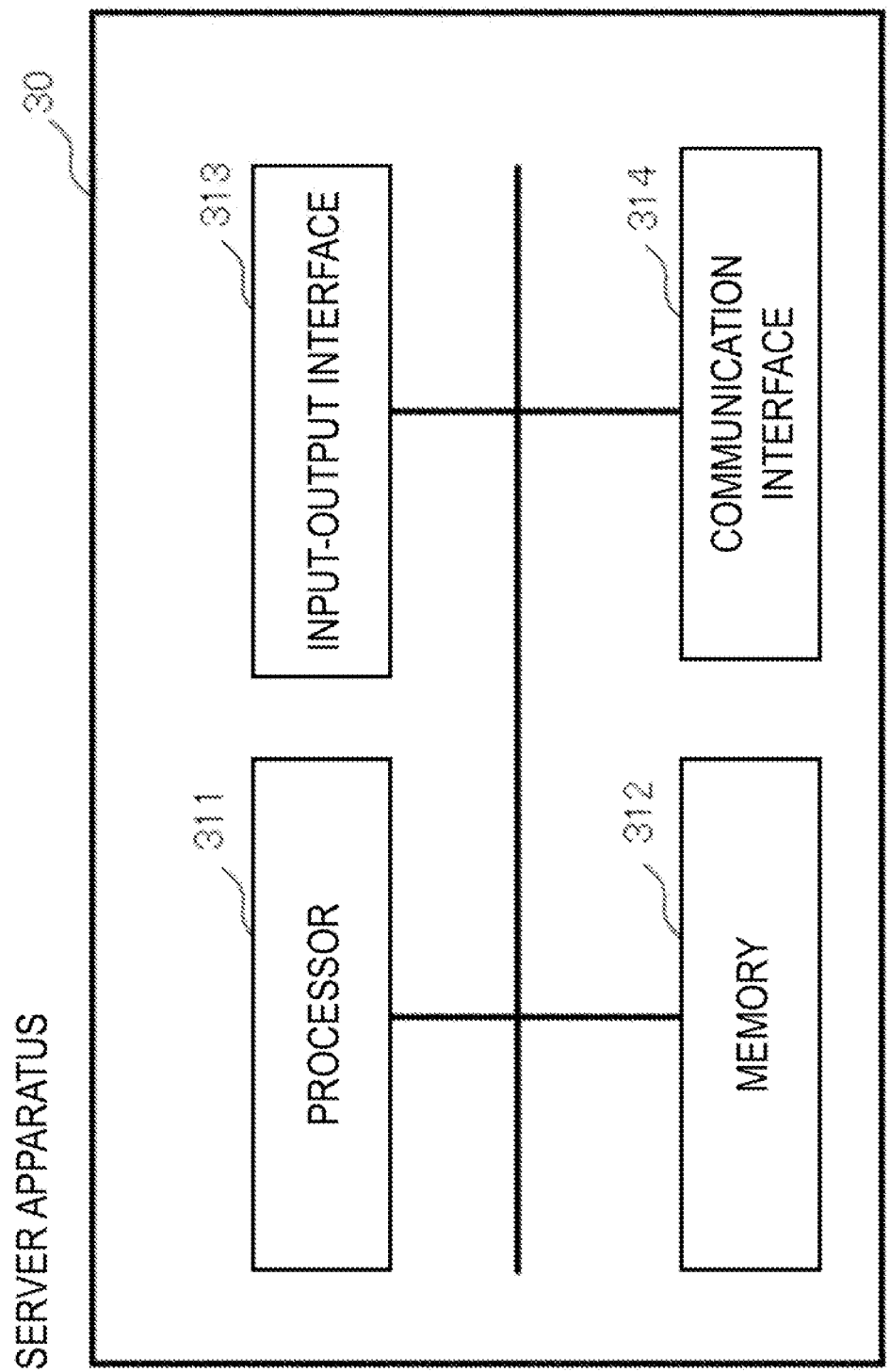
FIG. 14 is a diagram illustrating an example of a hardware configuration of the authentication server.

Next, hardware of the individual apparatuses constituting the authentication system will be described. FIG. 14 is a diagram illustrating an example of a hardware configuration of the server apparatus 30.

The server apparatus 30 can be configured by an information processing apparatus (a so-called computer) and includes a configuration illustrated as an example in FIG. 14. For example, the server apparatus 30 includes a processor 311, a memory 312, an input-output interface 313, a communication interface 314, etc. The components such as the above processor 311 are connected to an internal bus, etc. so that the components can mutually communicate with each other.

The hardware configuration of the server apparatus 30 is not limited to the configuration illustrated in FIG. 14. The server apparatus 30 may include hardware not illustrated or may be configured without the input-output interface 313 if desired. In addition, the number of components, such as the number of processors 311, included in the server apparatus 30 is not limited to the example illustrated in FIG. 14. For example, a plurality of processors 311 may be included in the server apparatus 30.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display apparatus and an input apparatus not illustrated. For example, the display apparatus is a liquid crystal display or the like. For example, the input apparatus is an apparatus, such as a keyboard or a mouse, which receives user operations.

The communication interface 314 is a circuit, a module, or the like that communicates with other apparatuses. For example, the communication interface 314 includes a NIC (Network Interface Card) or the like.

The function of the server apparatus 30 is realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the server apparatus 30, the terminals 10 and 20 can each be configured by an information processing apparatus, and the basic hardware configuration of the terminals 10 and 20 is the same as that of the server apparatus 30. Thus, description of the basic hardware configuration of the terminals 10 and 20 will be omitted. Specifically, while the terminals 10 and 20 differ from the server apparatus 30 in that the terminals 10 and 20 include a camera apparatus, other components of the terminals 10 and 20 may be configured in the same way as those of the server apparatus 30.

[Variation]

The configurations, operations, etc. of the authentication systems described in the above example embodiments are examples. The system configuration, etc. according to the present invention are not limited to the above examples.

For example, while the above example embodiments have been described based on a case in which a registered user database is established in the server apparatus 30, the registered user database may be established in an externally installed database server. In addition, the server apparatus 30 may be configured by a single physical information processing apparatus or by a plurality of physical information processing apparatuses. In the latter case, the plurality of information processing apparatuses may be connected to each other via a network.

The above example embodiments have been described based on a case in which the terminals 10 and 20 transmit feature values generated from face images of users to the server apparatus 30 in the authentication phase. However, the terminals 10 and 20 may transmit face images of (biological information about) users to the server apparatus 30 and may request the server to perform matching. In this case, the server apparatus 30 may extract the face images from the matching requests and may generate feature values in accordance with algorithm IDs. In addition, terminals that transmit feature values and terminals that transmit biological information (face images) may coexist in the authentication system.

Figure 15:
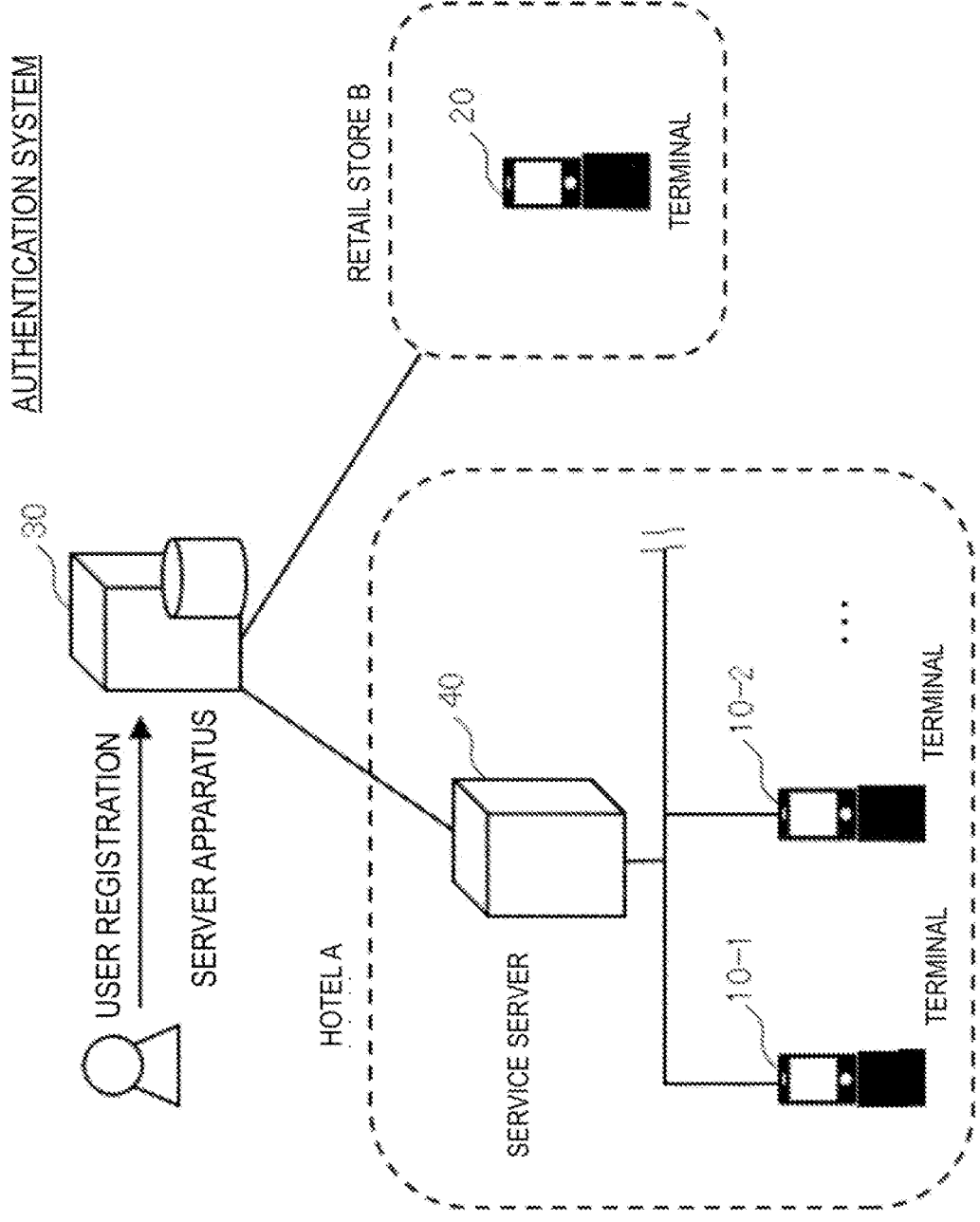
FIG. 15 is a diagram illustrating an example of a schematic configuration of an authentication system according to a variation in the present application disclosed.

The above example embodiments have been described based on a case in which the terminals 10 and 20 installed at service providers transmit matching requests to the server apparatus 30. However, a server installed per service provider may receive matching requests from the terminal 10 or 20 and may transmit (forward) the matching requests to the server apparatus 30. That is, a service-side network configuration may be a so-called server-client configuration as illustrated in FIG. 15. In the example illustrated in FIG. 15, a service server 40 installed at the hotel A receives matching requests from a plurality of terminals 10-1 and 10-2 and forwards these matching requests to the server apparatus 30. In addition, the service server 40 forwards the replies (user IDs) received from the server apparatus 30 to the matching request transmission sources.

In addition, when the configuration illustrated in FIG. 15 is adopted, the service server 40 may perform the processing of the service-to-be-used registration for the users. That is, the service server 40 may operate as an HTTP (Hyper Text Transfer Protocol) server to which the individual user enters a user ID and detailed information (a name, an address, etc.). In this case, in the service-to-be-used registration phase, the service server 40 may transmit a user ID and an algorithm ID to the server apparatus 30.

While the data exchange between the terminal 10 and the server apparatus 30 is not limited to any particular mode, data exchanged between these apparatuses may be encrypted. Face images and feature values calculated from these face images are personal information, and to appropriately protect the personal information, it is desirable that encrypted data be exchanged. In addition, the terminals 10 and 20 may transmit a matching request having a digital signature to the server apparatus 30. If the server apparatus 30 succeeds in verifying the digital signature, the server apparatus 30 may process the acquired matching request. In this way, the server apparatus 30 may be configured to verify the validity of each of the terminals 10 and 20 as the matching require transmission sources, by verifying a digital signature.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

While the industrial applicability of the present invention has been made apparent by the above description, the present invention is suitably applicable, for example, to personal authentication at the time of provision of accommodation services at hotels and at the time of payment for products at retail stores.

A part or the entirety of the example embodiments described above may be described as in the following supplementary notes, but is not limited to the followings.

[Supplementary Note 1]

A server apparatus, including:
  a communication unit that receives a matching request including an ID (Identifier) of an authentication algorithm supported by a terminal; and
  a matching unit that processes the matching request by using a registered user database in which IDs of users, feature values generated from biological information about the users, and IDs of authentication algorithms that can use the generated feature values are stored in association with each other.

[Supplementary Note 2]

The server apparatus according to supplementary note 1, wherein the matching unit processes the matching request by setting, among entries in the registered user database, feature values in entries having IDs of authentication algorithms that match the ID of the authentication algorithm included in the matching request, as registered-side feature values.

[Supplementary Note 3]

The server apparatus according to supplementary note 2,
  wherein the matching request includes a feature value generated from biological information about a user, the biological information having been acquired by the terminal, and
  wherein the matching unit processes the matching request by setting the feature value included in the matching request as a matching-side feature value.

[Supplementary Note 4]

The server apparatus according to any one of supplementary notes 1 to 3, wherein the matching unit transmits an ID of a user determined by the processing of the matching request to a terminal that has transmitted the matching request.

[Supplementary Note 5]

The server apparatus according to any one of supplementary notes 1 to 4, further including a feature value generation unit that generates a feature value to be stored in the registered user database from biological information about a user, the biological information having been acquired before the processing of the matching request.

[Supplementary Note 6]

The server apparatus according to any one of supplementary notes 1 to 4, wherein the server apparatus acquires information to be stored in the registered user database from the terminal.

[Supplementary Note 7]

A terminal, including:
  an acquisition unit that acquires biological information about a user; and a transmission unit that transmits an ID (Identifier) of a user, a feature value generated from biological information about the user, and an ID of an authentication algorithm that can use the generated feature value to a server apparatus.

[Supplementary Note 8]

An authentication system, including:

a terminal; and a server apparatus, wherein the server apparatus receives a matching request including an ID (Identifier) of an authentication algorithm supported by the terminal and processes the matching request by using a registered user database in which IDs of users, feature values generated from biological information about the users, and IDs of authentication algorithms that can use the generated feature values are stored in association with each other.

[Supplementary Note 9]

The authentication system according to supplementary note 8, wherein the server apparatus processes the matching request by setting, among entries in the registered user database, feature values in entries having IDs of authentication algorithms that match the ID of the authentication algorithm included in the matching request, as registered-side feature values.

[Supplementary Note 10]

The authentication system according to supplementary note 9, wherein the matching request includes a feature value generated from biological information about a user, the biological information having been acquired by the terminal, and wherein the server apparatus processes the matching request by setting the feature value included in the matching request as a matching-side feature value.

[Supplementary Note 11]

The authentication system according to any one of supplementary notes 8 to 10, wherein the server apparatus transmits an ID of a user determined by the processing of the matching request to a terminal that has transmitted the matching request.

[Supplementary Note 12]

The authentication system according to any one of supplementary notes 8 to 11, wherein the server apparatus generates a feature value to be stored in the registered user database from biological information about a user, the biological information having been acquired before the processing of the matching request.

[Supplementary Note 13]

The authentication system according to any one of supplementary notes 8 to 12, wherein the server apparatus acquires information to be stored in the registered user database from the terminal.

[Supplementary Note 14]

An authentication method, used in an authentication system including a terminal and a server apparatus, the authentication method including:

receiving a matching request including an ID (Identifier) of an authentication algorithm supported by the terminal; and processing the matching request by using a registered user database in which IDs of users, feature values generated from biological information about the users, and IDs of authentication algorithms that can use the generated feature values are stored in association with each other.

[Supplementary Note 15]

A computer-readable storage medium, storing a program that causes a computer mounted on a server apparatus to perform processing for:

receiving a matching request including an ID (Identifier) of an authentication algorithm supported by a terminal; and processing the matching request by using a registered user database in which IDs of users, feature values generated from biological information about the users, and IDs of authentication algorithms that can use the generated feature values are stored in association with each other.

The supplementary notes 14 and 15 can be expanded in the same way as the supplementary note 1 can be expanded into the supplementary note 2 to the supplementary note 6.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10, 10-1, 10-2, 20 terminal
30, 100 server apparatus
40 service server
101 communication unit
102, 205 matching unit
201, 301 communication control unit
202 user information acquisition unit
203 feature value registration unit
204, 307 feature value generation unit
206, 306 storage unit
302 user information registration unit
303 face image acquisition unit
304 matching request unit
305 function realization unit
311 processor
312 memory
313 input-output interface
314 communication interface

What is claimed is:

1. A server apparatus comprising:

at least one memory storing a set of instructions; and at least one processor configured to execute the set of instructions to:

receive, from a terminal apparatus, a first request comprising a user identity of a user and a first face data of the user;

for each of a plurality of face authentication algorithm identities:

generate a face feature value of the first face data by using the face authentication algorithm; and store the generated face feature value in association with the user identity and the face authentication algorithm identity, wherein the at least one processor is configured to execute the set of instructions to further:

receive, from the terminal apparatus, a second request comprising the generated first face feature value and a face authentication algorithm identity indicating the face authentication algorithm supported by the terminal apparatus, and send, to the terminal apparatus, a response comprising an authentication result of the user, the authentication result comprising the user identity of the user.

2. The server apparatus according to claim 1, wherein the one or more processors are configured to process the instructions to control the server apparatus to:

authenticate the user by comparing the received first face feature value and a plurality of the stored face feature values corresponding to the face authentication algorithm supported by the terminal apparatus.

3. The server apparatus according to claim 1, wherein the at least one processor is configured to execute the set of instructions to:

store the generated face feature value in association with the user identity and the face authentication algorithm identity and the first face data.

4. The server apparatus according to claim 3, wherein the at least one processor is configured to execute the set of instructions to:

in a case where a face authentication algorithm supported by the terminal apparatus is updated, generate a new face feature value from the stored first face data, and store the generated new face feature value in association with the user identity and the face authentication algorithm identity and the first face data.

5. The server apparatus according to claim 1, wherein the at least one processor is configured to execute the set of instructions to: encrypt the response before sending the response to the terminal apparatus.

6. The server apparatus according to claim 1, wherein the at least one processor is configured to execute the set of instructions to: verify a digital signature comprised in the second request before processing the second request.

7. A method performed by a server apparatus and comprising:

receiving, from a terminal apparatus, a first request comprising a user identity of a user and a first face data of the user;

for each of a plurality of face authentication algorithm identities:

generating a face feature value of the first face data by using the face authentication algorithm; and storing the generated face feature value in association with the user identity and the face authentication algorithm identity, wherein the method further comprises:

receiving, from the terminal apparatus, a second request comprising the generated first face feature value and a face authentication algorithm identity indicating the face authentication algorithm supported by the terminal apparatus, and sending, to the terminal apparatus, a response comprising an authentication result of the user, the authentication result comprising the user identity of the user.

8. A terminal apparatus comprising:

at least one memory storing a set of instructions; and at least one processor configured to execute the set of instructions to:

receive a first signal by using a first sensor;

acquire first user information of a user based on the received first signal, the first user information comprising a user identity of the user and a first face data of the user; and send, to a server apparatus, a first request comprising the user identity of the user and the first face data of the user, wherein the at least one processor is configured to execute the set of instructions to further:

receive a second signal by using a second senser;

acquire second user information of the user based on the received second signal, the second user information comprising a second face data of the user;

generate a first face feature value from the second face data by using a face authentication algorithm supported by the terminal apparatus;

send, to the server apparatus, a second request comprising the generated first face feature value and a face authentication algorithm identity indicating the face authentication algorithm supported by the terminal apparatus; and receive, from the server apparatus, a response comprising an authentication result of the user, the authentication result comprising the user identity of the user.

9. The terminal apparatus according to claim 8, wherein the second sensor is a camera device, and the at least one processor is configured to execute the set of instructions to: extract the second face data in a case where a size of a face region in an image captured by the camera device is equal to or larger than a predetermined value.

10. The terminal apparatus according to claim 8, wherein the at least one processor is configured to execute the set of instructions to:

measure a distance between the terminal apparatus and the user using a distance sensor or a stereo camera; and acquire the second face data in a case where the measured distance is equal to or less than a predetermined threshold.

11. The terminal apparatus according to claim 8, wherein the at least one processor is configured to execute the set of instructions to: provide a service to the user based on the authentication result received from the server apparatus.

12. The terminal apparatus according to claim 8, wherein the at least one processor is configured to execute the set of instructions to: encrypt the first request and the second request before sending the first request and the second request to the server apparatus.

13. The terminal apparatus according to claim 8, wherein the at least one processor is configured to execute the set of instructions to: add a digital signature to the second request before sending the second request to the server apparatus.

* * * * *